Nov. 13, 1934.   A. J. LANGHAMMER   1,980,540
METHOD OF MAKING TROLLEY SHOES
Filed June 4, 1931
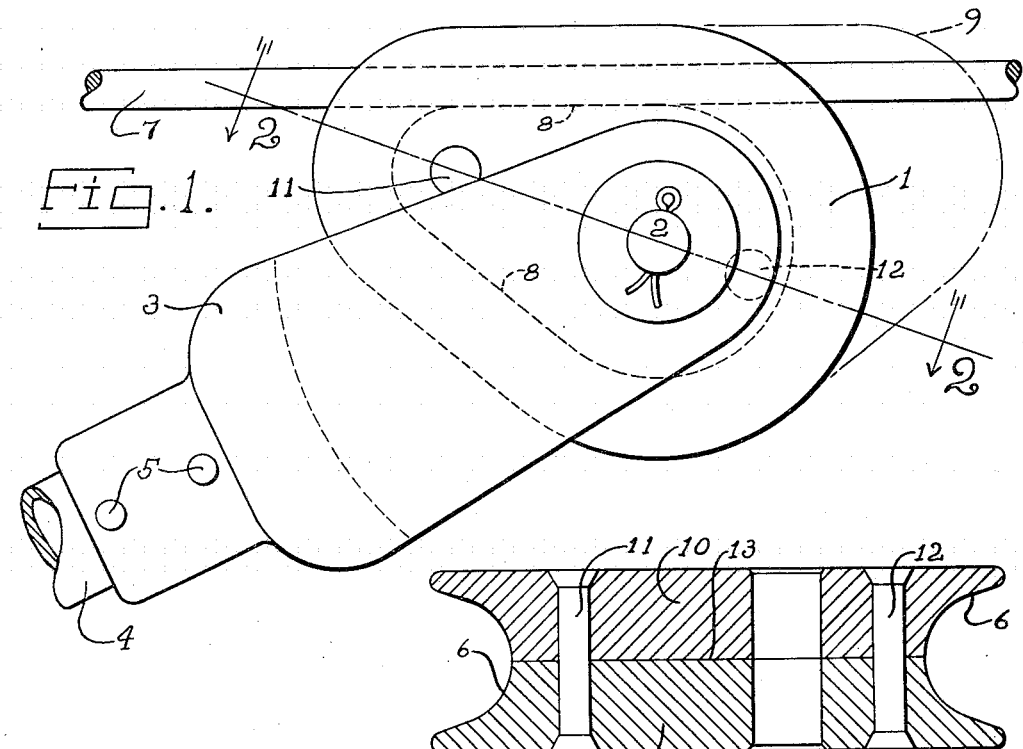
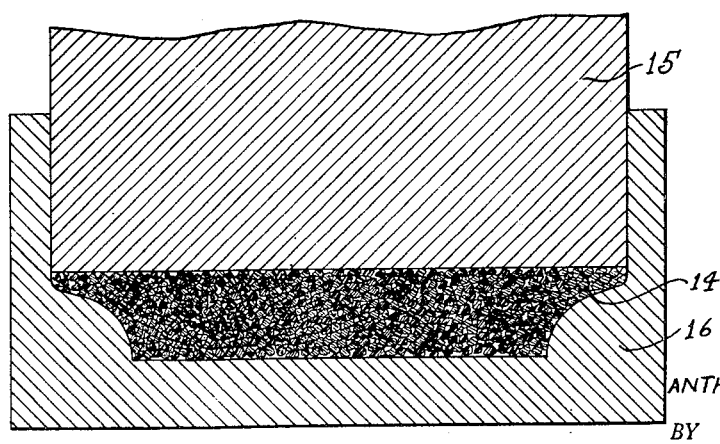
INVENTOR.
ANTHONY J. LANGHAMMER.
BY
ATTORNEY Patented Nov. 13, 1934

1,980,540

UNITED STATES PATENT OFFICE 1,980,540

METHOD OF MAKING TROLLEY SHOES

Anthony J. Langhammer, Detroit, Mich., assignor to Chrysler Corporation, Detroit, Mich., a corporation of Delaware Application June 4, 1931, Serial No. 542,111

3 Claims. (Cl. 29—155.55)

This invention relates to an improved trolley shoe.

The main objects of the invention are to provide a trolley shoe of the type which has sliding contact with a trolley wire; to provide a sliding contact shoe of this character which is continuously lubricated from an internal source during operation so as to minimize wearing of the shoe and the trolley wire with which it co-operates; to provide a porous shoe of this character which is impregnated with a substantial amount of lubricant that is available at all times at the surfaces of the shoe which contact with the trolley wire; to provide a trolley shoe having a porous structure and which includes metals that efficiently conduct electrical energy; and to provide a trolley shoe which is formed of convenable half sections that may be economically produced by a coining operation upon a mixture of suitable powdered metals.

An illustrative embodiment of the invention is shown in the accompanying drawing, in which:

Fig. 1 is a fragmentary side elevation of a trolley which is equipped with a shoe that embodies my invention.

Fig. 2 is a transverse section taken on the line 2—2 of Fig. 1.

Fig. 3 is a fragmentary sectional view diagrammatically illustrating the manner in which the complementary half sections of the trolley shoe shown in Figs. 1 and 2 are formed.

In the form shown, my improved trolley shoe 1 is somewhat pear-shaped and it is pivotally mounted upon a pin 2 which passes through the larger end portion of the shoe and which is received in apertures of a bifurcated bracket 3. The bracket 3 is rigidly fixed on the upper end of a trolley rod 4 by rivets 5. The shoe 1 has a continuous groove 6 in its periphery for receiving a trolley wire 7 which, during operation, has sliding contact with the walls of one of the straight side portions 8 of the continuous groove. The smaller end of the shoe normally leads the larger end thereof and when the direction of movement of the shoe is reversed it rotates about the axis of the pin 2 to the dotted line position shown at 9 in Fig. 1. During this rotation, the trolley is received in that portion of the groove which surrounds the large end of the shoe.

The shoe 1 includes two substantially identical half sections 10 having complementary groove segments in their peripheries which are rigidly secured together, with the groove segments in registration with each other, by rivets 11 and 12. The shoe sections 10 are formed of a metal composition which has a large degree of porosity and the pores of the structure are filled with lubricant. The pores of the body portion of the shoe communicate with the pores at the surfaces of the groove 6 with which the trolley slidably contacts so as to continuously maintain a film of lubricant on the bearing surfaces of the shoe.

The pores of the shoe sections 10 are also open at the contacting faces thereof so as to permit lubricant to permeate through the seam 13 between the two shoe sections and to migrate to the sliding contacting surfaces of the shoe.

The shoe sections 10 are preferably formed, as illustrated in Fig. 3, by coining a mixture 14 of powdered metals between male and female die parts 15 and 16, respectively, under a pressure of sufficient amplitude to firmly compact the powdered metals. Various combinations of metals may be used. A composition having suitable physical properties and electrical conductivity may be produced by mixing together substantially 85 parts of powdered copper, 13 parts of powdered tin, about 2 parts of graphite and a small amount of stearic acid, or other solid or liquid lubricant. The compressed mixture is then sintered at a temperature of substantially 1500° F. This temperature is considerably above the melting point of tin and safely below the melting point of copper. Shoe sections formed in this manner are highly porous and if quenched in oil before cooling, or submerged in oil after cooling, they absorb a substantial quantity of the oil.

During operation, the oil permeates through the pores of the sliding contact surfaces of the shoe and migrates through the seam of the shoe sections to the sliding surfaces preventing wear and untimely failure of the shoe and trolley wire 7 with which the shoe contacts.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. The method of manufacturing a trolley shoe which consists in separately coining a pair of trolley shoe sections each having a complementary groove segment from a mixture of powdered metals having different fusion points, sintering said coined mixture at a temperature below the fusion point of one of the metals and above the fusion point of the other metal, impregnating said sections with mobile lubricant, and securing said sections together with the groove segments thereof in registration.

2. The method of manufacturing a trolley shoe which consists in separately coining a pair of trolley shoe sections each having a complementary groove segment from a mixture of powdered metals having different fusion points which consists in placing said mixture in a mold, compressing said mixture in a direction perpendicular to said groove, sintering said mixture at a temperature below the fusion point of one of the metals and above the fusion point of the other metal, impregnating said sections with lubricant, and securing said sections together with the groove segments thereof in registration.

3. The method of manufacturing grooved metallic articles which consists in placing mixtures of powdered metals having different fusion points in molds of the shape of portions of the article including a portion of the groove, compressing said mixtures in directions perpendicular to the groove portions, removing said portions from said molds, sintering them at a temperature below the fusion point of one of the metals and above the fusion point of the other metal, and securing them together with the groove portions in registration.

ANTHONY J. LANGHAMMER.